G. E. WILLIAMS.
MOTOR SLED.
APPLICATION FILED APR. 2, 1921.
1,407,974. Patented Feb. 28, 1922.
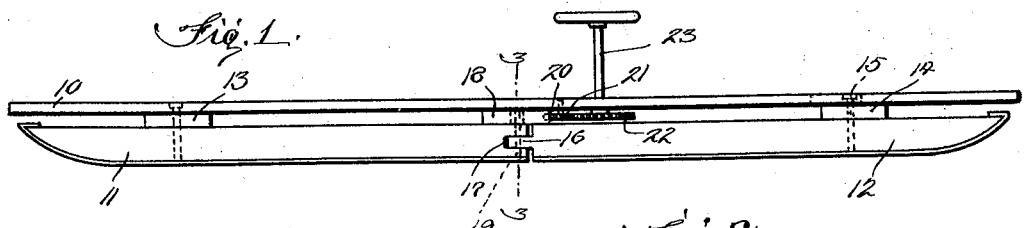
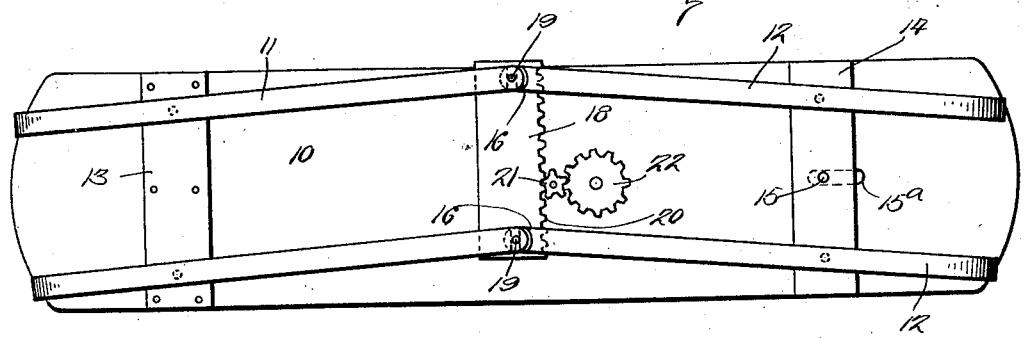
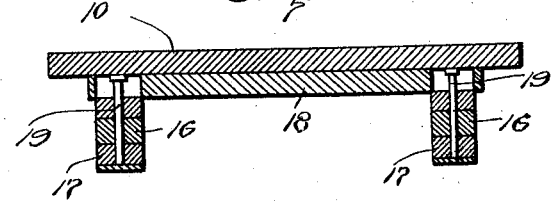
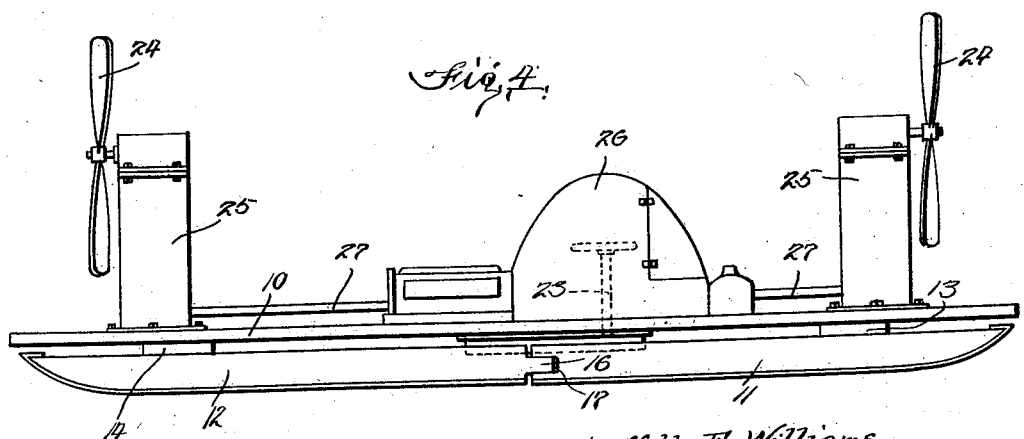
Griffith E. Williams, INVENTOR.
BY Watson E. Coleman, ATTORNEY.

UNITED STATES PATENT OFFICE.

GRIFFITH E. WILLIAMS, OF CAMBRIA, WISCONSIN.

MOTOR SLED.

1,407,974.  Specification of Letters Patent.  Patented Feb. 28, 1922.

Application filed April 2, 1921. Serial No. 457,851.

*To all whom it may concern:*

Be it known that I, GRIFFITH E. WILLIAMS, a citizen of the United States, residing at Cambria, in the county of Columbia and State of Wisconsin, have invented certain new and useful Improvements in Motor Sleds, of which the following is a specification, reference being had to the accompanying drawings.

This invention relates to motor sleds, and particularly to the steering mechanism thereof.

The general object of my invention is to provide a steering mechanism, which mechanism is strong, quick, and particularly effective in guiding the sled, and which will eliminate all sudden jerks and strains on the hands of the driver.

A further object is to provide a construction of this character in which forward and rear pairs of runners are pivotally connected to each other, and wherein the steering is accomplished by shifting both pairs of runners, thus securing a very easy steering movement and quick response to the steering action.

And a further object is to provide a mechanism of this kind in which the two pairs of steering runners, which are pivotally connected to each other, are operated by means of a cross bar pivotally connected to both pairs of steering runners, this cross bar in turn being operated by gearing so that it will require but a small amount of manual power to be applied to the runners in order to shift them.

Other objects will appear in the course of the following description.

My invention is illustrated in the accompanying drawings, wherein:—

Figure 1 is a side elevation of the body and runners of a dirigible sled constructed in accordance with my invention;

Figure 2 is an under side plan view of the sled body shown in Figure 1;

Figure 3 is a section on the line 3—3 of Figure 1;

Figure 4 is a side elevation of the sled with the propelling mechanism thereon;

Referring to these drawings, 10 designates the body or platform of a motor sled which is supported by front pairs of runners 11 and by rear pairs of runners 12. The front pair of runners is pivoted to a cross bar 13 which is rigidly connected to the platform or body 10 and the rear pair of runners is pivoted to a cross bar 14 which is pivoted to the platform by means of a pivot pin, bolt or equivalent element 15 extending through a slot 15ª. The adjacent ends of the runners are pivoted to each other. Thus, for instance, the rear runners 12 are shown as being provided with tongues 16, while the rear ends of the forward runners are shown as forked to receive said tongues, as at 17.

Passing vertically through the knuckle joint thus formed and through a laterally shiftable rack bar 18 are the pivot pins, bolts or other equivalent connecting devices 19. The rack bar 18 is formed with rack teeth 20, and engaging said rack teeth is a pinion 21 suitably supported upon the platform 10, and operatively engaging this pinion 21 is a relatively large gear wheel 22. This gear wheel 22 is mounted upon a steering post 23 which extends downward through the body or platform of the sled and is provided with a steering handle wheel of any suitable character.

It will be obvious now that when the steering post or shaft is rotated, rotation will be communicated to the pinion 21 and the cross bar 18 will be caused to shift laterally in a direction reverse to the direction of movement of the gear wheel 22. This will cause the connected ends of the runners to be shifted laterally in the same direction as the cross bar so that the front and rear pairs of runners will be angularly disposed with relation to each other and in such a direction as to cause the sled to steer toward the side toward which the steering wheel is turned. In other words, if the steering wheel be given a clockwise rotation, which is commonly called a rotation toward the right, the connected ends of the runners will be shifted toward the right and this will cause the sled to steer toward the right, and vice versa. The cross piece 13 is rigidly bolted to the platform and this prevents the sled from zigzagging as it otherwise would tend to do. The sled is to be provided with propelling means of any suitable character, an engine or motor connected to the propelling means, and with a cap or body including a hood over the engine, a windshield, top, etc., as desired.

I do not wish to be limited to any particular manner of propelling the sled, nor to the particular construction of the cab, propellers, etc., this invention relating entirely to the manner in which the runners are to be controlled for steering movement. By jointing the pairs of runners at their connected ends, there will be no tendency of the runners to bob up and down independently of each other due to roughnesses in the road and the sled will not zigzag if it strikes an obstruction. By providing the two pairs of runners pivotally connected to each other and providing means for shifting both runners so that the front runner will be in angular relation to the rear runner when the sled is being steered to one side, I secure a much better steering action than is possible where only the forward runners or the rear runners are dirigible, as there is no tendency of the rear portion of the sled or of the rear runners to follow in a straight line when the forward runners have turned laterally. The response to the steering movement is very quick and at the same time the runners may be very accurately shifted by means of the gearing between the steering shaft and the runners. By means of this gearing strain on the steersman is reduced and his arms are not subjected to the jars and jolts as they would be were the steering shaft connected directly to the runners, and at the same time the runners may be held more steadily in adjusted positions.

I have illustrated a propelling mechanism such as that disclosed in my Patent, #1,363,071, granted December 21, 1920, on motor sleighs, but obviously the steering mechanism might be used with other forms of propelling mechanism. The propelling mechanism consists of propelling blades 24 mounted on supporting columns 25 adjacent opposite ends of the sled, these propelling blades being driven by driving shafts connected to an engine disposed within the cab or housing 26, the main driving shaft being designated 27. A suitable gear shifting and clutch mechanism are provided for driving the propellers at different speeds or for disconnecting the engine from the propellers or connecting it thereto. Suitable brake mechanism may be also provided and anti-skidding means, but I have not illustrated all these various instrumentalities inasmuch as they are fully illustrated in my prior patent heretofore referred to.

I claim:—

1. A sled or like vehicle including a body, a forward pair of runners operatively pivoted to the body intermediate their ends for oscillation in a horizontal plane, a support pivoted to the body adjacent the rear end thereof for oscillation in a horizontal plane, a rear pair of runners pivoted to the ends of said support intermediate the ends of the runners, pivotal connections between the rear ends of the forward runners and the forward ends of the rear runners, and manually operable means for shifting the connected ends of the runners laterally in either direction, and means permitting the runners to be oscillated in either direction beyond their median position.

2. A sled or like vehicle including a body, a forward pair of runners operatively pivoted to the body intermediate their ends for oscillation in a horizontal plane, a support pivoted to the body adjacent the rear end thereof for oscillation in a horizontal plane, a rear pair of runners pivoted to the ends of said support intermediate the ends of the runners, pivotal connections between the rear ends of the forward runners and the forward ends of the rear runners, a transversely shiftable bar pivotally connected to the adjacent ends of the forward and rear pairs of runners, and manually operable means for shifting said bar, and means permitting the runners to be oscillated in either direction beyond their median position.

3. A sled or like vehicle including a body, a forward pair of runners operatively pivoted to the body intermediate their ends for oscillation in a horizontal plane, a support pivoted to the body adjacent the rear end thereof for oscillation in a horizontal plane, a rear pair of runners pivoted to the ends of said support intermediate the ends of the runners, pivotal connections between the rear ends of the forward runners and the forward ends of the rear runners, a transversely shiftable bar pivotally connected to the adjacent ends of the forward and rear pairs of runners, and manually operable means for shifting said bar including a shaft having a gear wheel, rack teeth on the bar, and gearing between said gear wheel and said rack teeth, and means permitting the runners to be oscillated in either direction beyond their median position.

4. A sled or like vehicle having a body, a brace extending across the forward portion of the body and rigidly connected thereto, a forward pair of runners pivoted intermediate their ends to said brace for oscillation in a horizontal plane, a supporting member mounted upon the body adjacent its rear end for movement in a horizontal plane toward or from the front runners, a rear pair of runners pivoted to the ends of said supporting member, a rack bar having transverse movement, a pivotal connection between the rear ends of the forward pair of runners and the forward ends of the rear pair of runners and including pivot pins passing through the extremities of said rack bar, a gear wheel engaging the rack bar, and manually operable means for rotating said gear wheel to steer the machine.

5. A sled or like vehicle having a body, a brace extending across the forward portion of the body and rigidly connected thereto, a forward pair of runners pivoted intermediate their ends to said brace for oscillation in a horizontal plane, a supporting member mounted upon the body adjacent its rear end for movement toward or from the forward runners in a horizontal plane, a rear pair of runners pivoted to the ends of said supporting member, a rack bar having transverse movement, a pivotal connection between the rear ends of the forward pair of runners and the forward ends of the rear pair of runners and including pivot pins passing through the extremities of said rack bar, a gear wheel engaging said rack bar and having a relatively small diameter, a relatively larger gear wheel, and a steering shaft connected to said gear wheels.

In testimony whereof I hereunto affix my signature.

GRIFFITH E. WILLIAMS.